US010338761B1

(12) United States Patent
Khan et al.

(10) Patent No.: US 10,338,761 B1
(45) Date of Patent: Jul. 2, 2019

(54) VARIABLE DE-EMPHASIS OF DISPLAYED CONTENT BASED ON RELEVANCE SCORE

(75) Inventors: Yasmin Khan, Oakland, CA (US); Maxwell E. Planck, Oakland, CA (US); Najeeb Tarazi, San Francisco, CA (US); Michael Kass, Berkeley, CA (US)

(73) Assignee: PIXAR, Emeryville, CA (US)

( * ) Notice: Subject to any disclaimer, the term of this patent is extended or adjusted under 35 U.S.C. 154(b) by 1835 days.

(21) Appl. No.: 13/082,959

(22) Filed: Apr. 8, 2011

(51) Int. Cl.
*G06F 3/048* (2013.01)

(52) U.S. Cl.
CPC .................................. *G06F 3/048* (2013.01)

(58) Field of Classification Search
None
See application file for complete search history.

(56) References Cited

U.S. PATENT DOCUMENTS 9,317,602 B2 * 4/2016 van Zwol ......... G06F 17/30648
2006/0101005 A1 * 5/2006 Yang et al. ....................... 707/3

* cited by examiner

*Primary Examiner* — Thanh T Vu
(74) *Attorney, Agent, or Firm* — Kilpatrick Townsend & Stockton LLP

(57) ABSTRACT

User interface display layouts are provided that draw a user's attention to a specific element or elements by de-emphasizing the surrounding content, but without removing the de-emphasized content from the interface. This ability to maintain the whole presentable layout with visibility layers and without layout changes provides a useful navigation experience for the user as it is clear where the user's attention should go and yet the surrounding content is still subtly there, constantly reminding the user of the other available content. De-emphasis of certain content items is achieved by modifying display characteristics of those content items relative to a base display level, for example by lowering saturation, lowering opacity, and/or de-focusing (as if the user is looking through a camera) and modification can be done variably. Driven by a relevancy score, each content item in a display layout can be de-emphasized more or less depending on which content is more meaningful to the user's filtering actions.

21 Claims, 5 Drawing Sheets

VARIABLE DE-EMPHASIS OF DISPLAYED CONTENT BASED ON RELEVANCE SCORE

BACKGROUND

The present invention relates generally to user interface displays, and more particularly to de-emphasizing certain content in user interface displays.

In most current layout display technology/applications, a user is often inundated with a variety of displayed content, some or much of which may be superfluous to the user's desired viewing at that time. For example, an internal web page for a corporation might display portions of articles or documents for a variety of departments. Often, the user is only interested in a subset of the displayed content. Many such layout applications allow for filtering of certain content, for example, by providing a filter and then only displaying content that matches a user's filter query; the remaining content is no longer displayed. To review removed content, the user must navigate back to a prior layout display. This can be a cumbersome and inefficient process for the user.

Accordingly, what is desired are improved methods and apparatus for solving some of the problems discussed above. Additionally, what is desired are improved methods and apparatus for reducing some of the drawbacks discussed above.

BRIEF SUMMARY

The present invention provides systems and methods for de-emphasizing certain content in a user interface display.

In certain embodiments, de-emphasis processing allows for providing a user interface display layout that draws the user's attention to a specific element or elements in a computer interface by de-emphasizing the surrounding content, but not removing the surrounding content from the interface. This ability to retain the entirety of the real estate of what is presentable without layout changes provides a better navigation experience for the user—it is clear where their attention should go and yet the surrounding content is still subtly there, constantly reminding the user of the entirety of what is available. De-emphasis of certain content items can be achieved by modifying display characteristics of those content items relative to a base display level, for example by lowering saturation, reducing contrast, lowering opacity, and/or de-focusing (as if the user is looking through a camera) and modification can be done variably. Driven by a relevancy score, each content item in a display layout can be de-emphasized more or less depending on which content is more meaningful to the filtering action(s).

According to one aspect of the present invention, a computer implemented method provides a visual guide on a user interface. The method typically includes receiving content to display to a user, the content including a plurality of content items, and displaying at least a portion of the content on a display. The method also typically includes receiving a content request for a subset of content, scoring the content items based on the content request to determine a subset of content items, and visually deemphasizing the subset of content items relative to a base display level of the displayed content in response to the scoring without fully removing the subset of content items from the display. In certain aspects, the various processing steps are implemented in one of a web browser application, and e-reader application, a document editing application (e.g., MS WORD™, Adobe Acrobat™) or a photo editing application. In certain aspects, the display includes one of a monitor display screen, an e-reader display screen such as a Kindle™ display, an iPad™ display, and iPod™ display, and iPhone™ display, a cell phone display. In certain aspects, the content items are selected from the group consisting of documents, articles, paragraphs of text, or pictures.

According to another aspect of the present invention, a tangible computer readable medium is provided that stores code, which when executed by a processor, causes the processor to receive content to display to a user, the content including a plurality of content items and to display at least a portion of the content on a display device. The code also causes the processor to receive a content request for a subset of content, to score the content items based on the content request to determine a subset of content items, and to visually deemphasize the subset of content items relative to a base display level of the displayed content in response to the scores of the content items without fully removing the subset of content items from the display.

According to yet another aspect of the present invention, a computer system is provided that typically includes a display device, and a processor, coupled with the display device, wherein the processor is configured to execute code which causes the processor to receive content to display to a user, the content including a plurality of content items, and to display at least a portion of the content on the display device. The processor is further configured to receive a content request for a subset of content, to score the content items based on the content request to determine a subset of content items, and to visually deemphasize the subset of content items relative to a base display level of the displayed content in response to the scores of the content items without fully removing the subset of content items from the display device. In certain aspects, the code is stored on a tangible computer readable medium, such as a RAM, ROM, hard disk, portable memory device or other type of memory device or system.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION

The present invention provides systems and methods for emphasizing or de-emphasizing content in a user interface (UI) display. Embodiments allow a user to navigate displayed content based on concepts or contexts selectable by the user.

Various embodiments provide user interface display layouts that focus a user's attention on a specific content element or elements of the layout by de-emphasizing the surrounding content, but without removing the de-emphasized content from the interface. These embodiments advantageously maintain the whole presentable layout with visibility layers, and without layout changes, which provides a useful navigation experience for the user. It is clear where the user's attention should go and yet the surrounding content is still subtly there, constantly reminding the user of the other available content. De-emphasis of certain content items is achieved, in certain embodiments, by modifying display characteristics of those content items relative to a base display level, for example by lowering saturation, lowering opacity, altering contrast and/or de-focusing (as if the user is looking through a camera) and modification can be done variably. Driven by a relevancy score, each content item in a display layout can be de-emphasized more or less depending on which content is more meaningful to the user's filtering actions.

Figure 1:
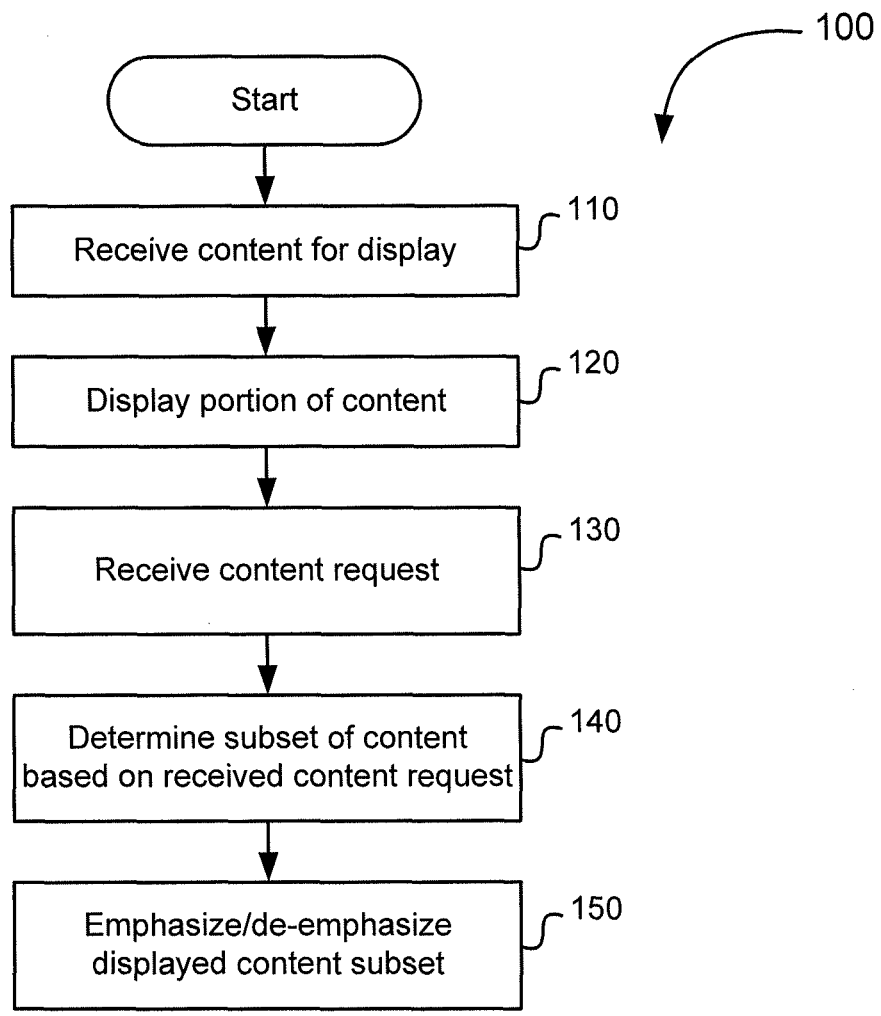
FIG. 1 illustrates a method for de-emphasizing content in a user interface display according to one embodiment.

FIG. 1 illustrates a de-emphasis processing method 100 according to one embodiment. In step 110, content for a UI display is received. The content may include various objects, documents or articles received over the Internet, an intranet, an extranet or any source system. The content may be stored in memory, on a hard disk, in a relational database, or in any other storage system as is well known. In certain embodiments, the content includes metadata describing various attributes of the content. For articles, for example, the metadata, might include date and author information. In one embodiment, the metadata includes one or more fields for tags or context identifiers that associate the content items with one or a plurality of context categories. For example, within an organization's website, documents or articles relevant to a certain department may be tagged as being relevant to that certain department, or perhaps more than one department. Articles relevant to other departments are tagged as being relevant to those other departments. As an example, an HR article may only be relevant to the HR department and may be tagged only with an HR context identifier. However, an article discussing a certain technology may be relevant to two (or more) separate technical departments within that organization, and hence may be tagged with context identifiers for each of the relevant technical departments. In certain embodiments, documents are pre-tagged, e.g., manually, or automatically. For automatic tagging, an algorithm that searches for various keywords or features (e.g., in the case of images) populates the tag fields. In one embodiment, documents or articles are manually tagged. For example, each article is manually tagged by a user as relating to a certain context, or more than one context. In certain embodiments, documents might include articles, photos, videos, or any other document type or object type that is definable into contexts and which may be tagged (e.g., in metadata) or otherwise distinguished.

Figure 2:
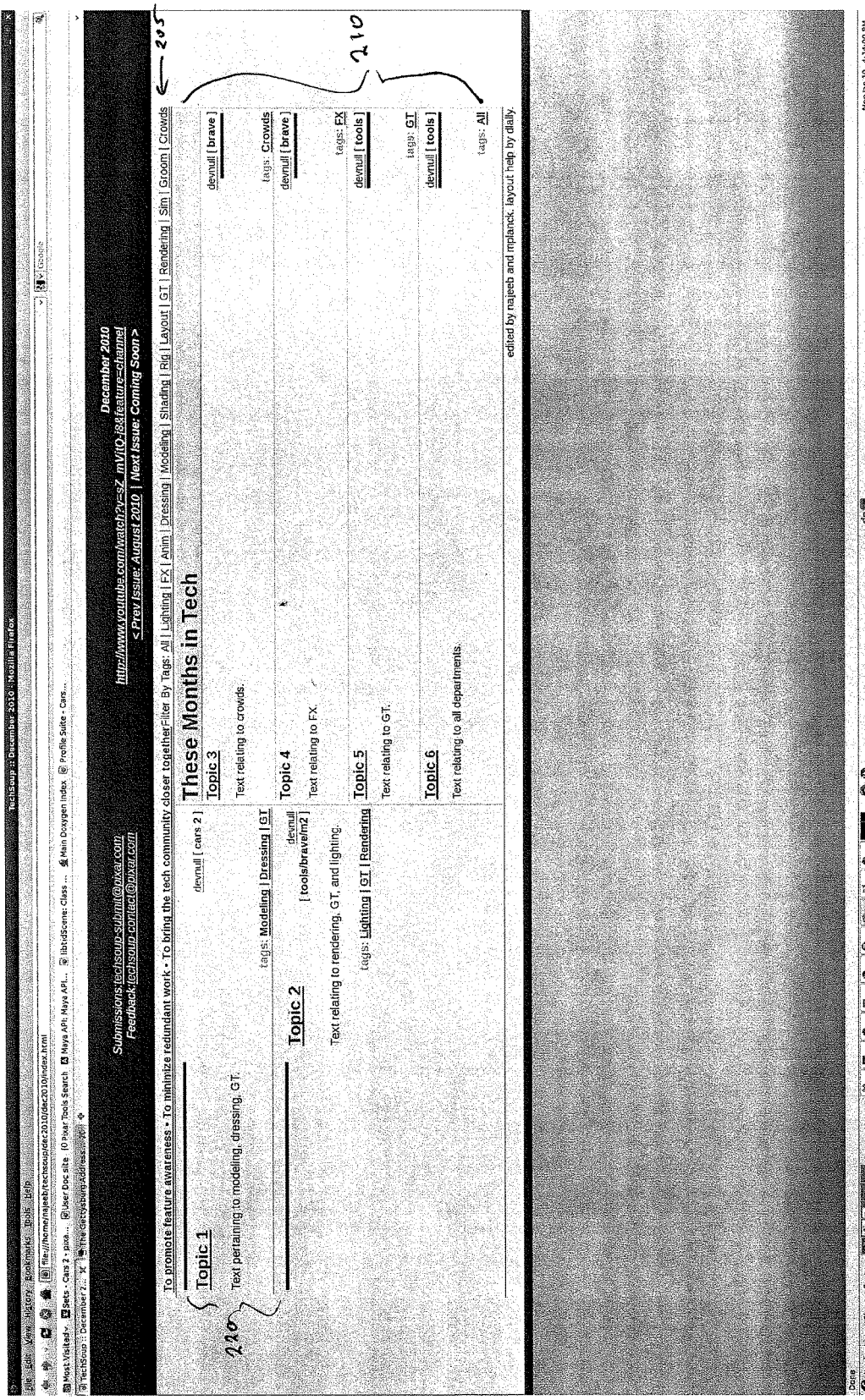
FIG. 2 illustrates an example of a UI display with displayed content.

In step 120, content is displayed on a UI display window 200, e.g., on a monitor 410 as shown below in FIG. 4. FIG. 2 illustrates an example of a UI layout with displayed content. As shown, a portion of the content is displayed; portions of articles/content are displayed in sub-window 210, and portions of other content/articles are displayed in sub-window 220. Portions of content may include portions of articles or abstracts of articles, pictures or portions of pictures, stills for video sequences, etc.

In step 130, a content request is received. The content request may be automatically generated or it may be generated based on a user action, such as a selection of a user interface element. For example, as shown in FIG. 2, various context identifiers 205, e.g., in the form of links, are provided to allow a user to select certain context categories for emphasizing certain displayed content relative to other displayed content. For example, a user may desire to emphasize, or bring certain content forward in the display, relative to other displayed content to more easily navigate the displayed content. In one embodiment, a search box (not shown) is provided to enable a user to enter one or more keywords to allow for real-time search and filtering of content items for de-emphasis. In certain aspect, the search box provides auto fill-in of keywords in a search index of words related to tags. In certain embodiments, the content request is automatically generated, for example in response to user profile information stored on the system. Such stored information could be pre-input by a user and/or learned by the system through previous interactions with the user.

In step 140, a determination is made, based on the received content request, as to which content is deemed not relevant to the user content request, e.g., whether all or a subset of the content is not relevant to the user content request. For example, in one embodiment, relevancy scores for the content items are determined based on the user content request, and a subset of the content is determined based on the relevancy score. The relevancy scoring may be performed for the displayed content items only, or it may be performed for the entire of corpus of stored content items. In one embodiment, if the relevancy score for a content item is above (or below) a threshold value, that content item is deemed relevant. In certain aspects, the subset of content determined in step 140 identifies "non-requested content" or content items that the user wishes to have de-emphasized in the display. It should be appreciated that the user could specifically request certain content be emphasized (or the user could specifically request certain content be de-emphasized) and the remaining content would be de-emphasized. Whether the relevancy score need be above or below a threshold is a matter of design choice based on the scoring algorithm used. In one embodiment, the relevancy score is used to de-emphasize content on a graded scale, for example a content item having a relevancy score of 50 (out of 100) may have a display characteristic (e.g., opacity or contrast) reduced by 50%, whereas a content item having a relevancy score of 25 (out of 100) may have its characteristic (e.g., opacity or contrast) reduced by 75%.

An example of a useful relevancy scoring algorithm is Google's PageRank algorithm. As will appreciated by one skilled in the art, any scoring algorithm may be used as appropriate for the application and content items being displayed. In general, a relevancy scoring algorithm searches an index of keywords (whether taken from the body of the content item, or metadata associated with the content item) to provide a relevancy score based on the applied filter (e.g., search criteria).

Figure 3A:
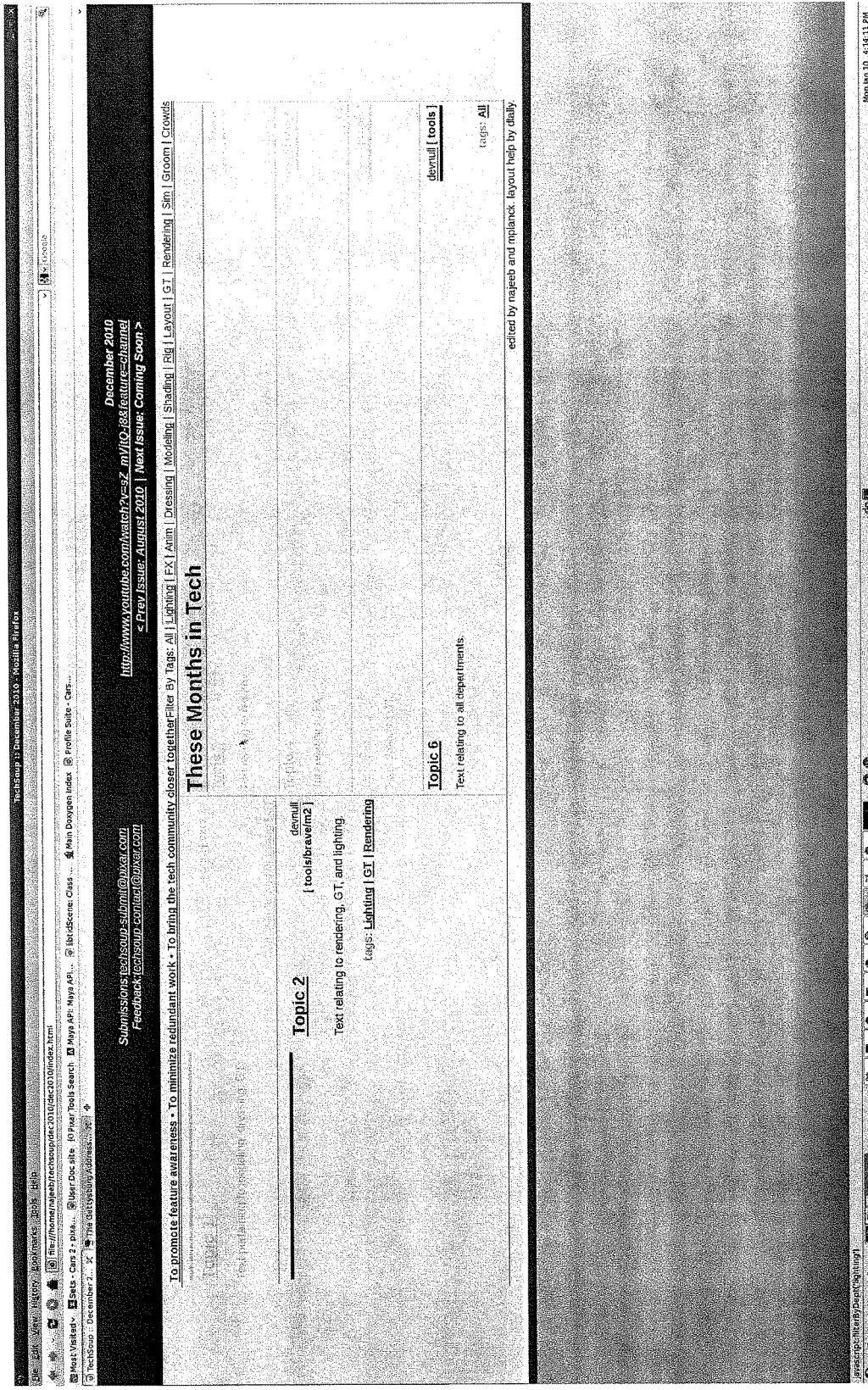
FIG. 3a illustrates the display of FIG. 2 with a subset of content de-emphasized.
Figure 3B:
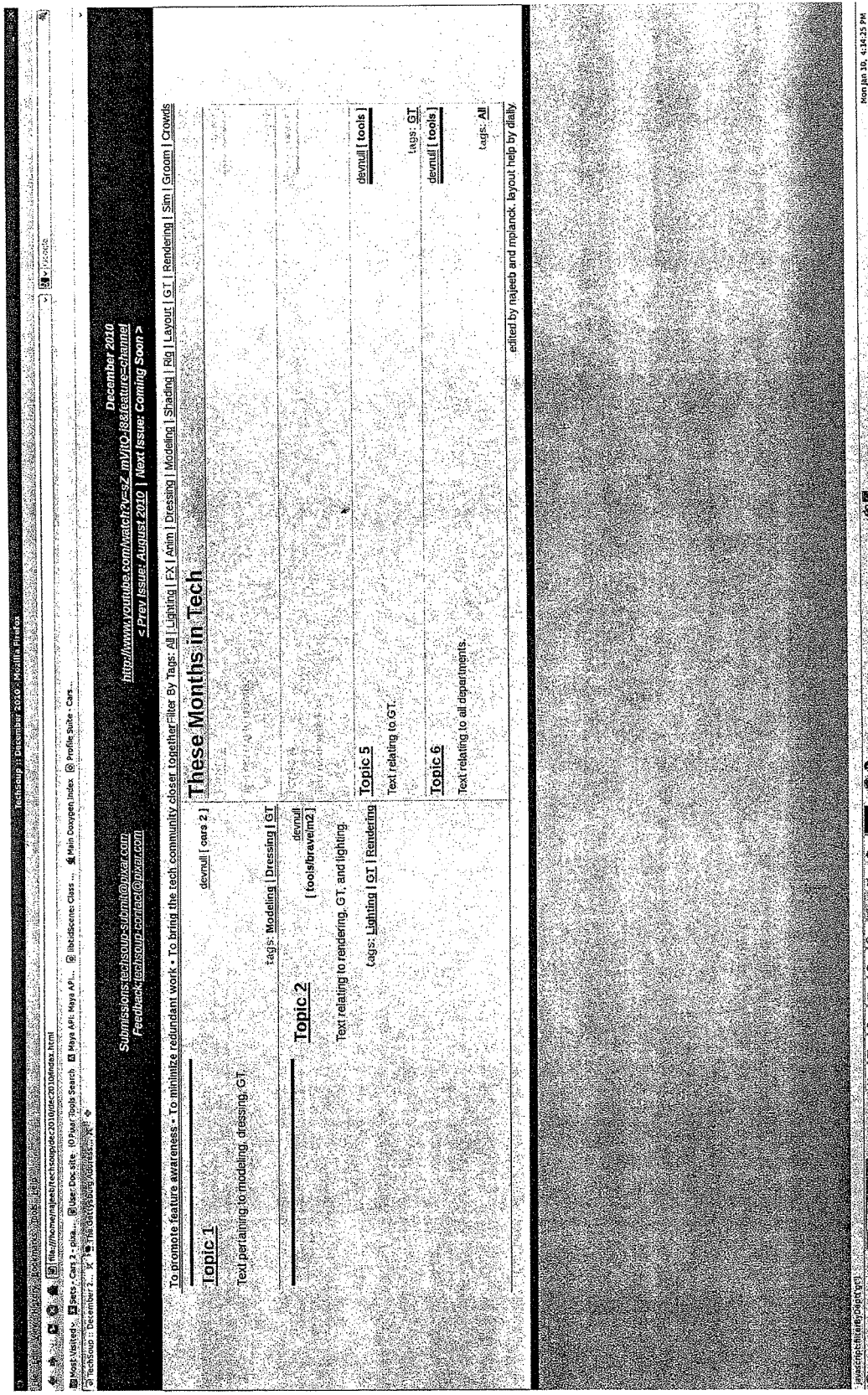
FIG. 3b illustrates the display of FIG. 2 with a different subset of content de-emphasized, according to one embodiment.

In step 150, the subset of content determined in step 140 is visually de-emphasized in the displayed layout. For example, FIG. 3a illustrates the layout of FIG. 2 with a subset of content de-emphasized; here the "Lighting" tag has been selected, indicating that the user is interested in de-emphasizing any content not related to lighting. FIG. 3b illustrates the layout of FIG. 2 with a different subset of content de-emphasized; here the "GT" tag has been selected, indicating that the user is interested in de-emphasizing any content not related to GT. As can be seen, the Topic 6 is displayed in the base display level in both FIGS. 3a and 3b as it includes content related to both GT and Lighting. In both cases, content is filtered based on a user action (e.g., user content request). As shown, the subset of content is de-emphasized by displaying that content with reduced opacity relative to the base display level of content items. The opacity may be reduced by about 50% as shown, or generally from about 10% to 75% or more, relative to the base display level. Other alternate or additional ways to de-emphasize content include modifying characteristics such as reducing saturation or contrast, de-focusing, changing the color or hue, etc. relative to base display levels.

In one embodiment, the scoring algorithm is configured to identify three or more levels of relevance for the subset of content items so as to provide three or more levels of visual de-emphasis. For example, two or more threshold levels may be defined and subsets of content items may be determined based on their relevance score relative to the threshold values. The three or more subsets of content items are de-emphasized as above based on their relevancy score by modifying one or more characteristics such as opacity, contrast, saturation, focus, color, hue, etc. For multiple levels of de-emphasis, certain degrees of modification, or reduction, in a display characteristic allow a user to identify the relevance visually. For example, where opacity is reduced, one subset of content items may have opacity reduced by about 10% to about 25% or more and another subset may have opacity reduced by about 50% or more to further visually distinguish (and de-emphasize) displayed content to various degrees based on the relevance scores. In certain aspects, the content may be de-emphasized in a gradual fashion based on the relevancy score (normalized if necessary) as discussed above. In one embodiment, one or more characteristics may be modified differently for different subsets of content items. For example, one subset of content items may have opacity reduced and another subset may have saturation or focus reduced, or one subset may have opacity reduced and a second subset may have opacity reduced by a greater amount and also have focus or saturation reduced.

As can be seen, embodiments advantageously provide user interface display layouts that draws the user's attention to a specific element or elements by de-emphasizing the surrounding content, but not removing it from the interface. This ability to maintain the whole presentable layout with visibility layers and without layout changes provides a useful navigation experience for the user as it is clear where the user's attention should go and yet the surrounding content is still subtly there, constantly reminding the user of the other available content. De-emphasis of certain content items can be achieved by modifying display characteristics of those content items relative to a base display level, for example by lowering saturation, lowering opacity, and/or de-focusing (as if the user is looking through a camera) and modification can be done variably. Driven by a relevancy score, each content item in a display layout can be de-emphasized more or less depending on which content is more meaningful to the user's filtering actions.

Figure 4:
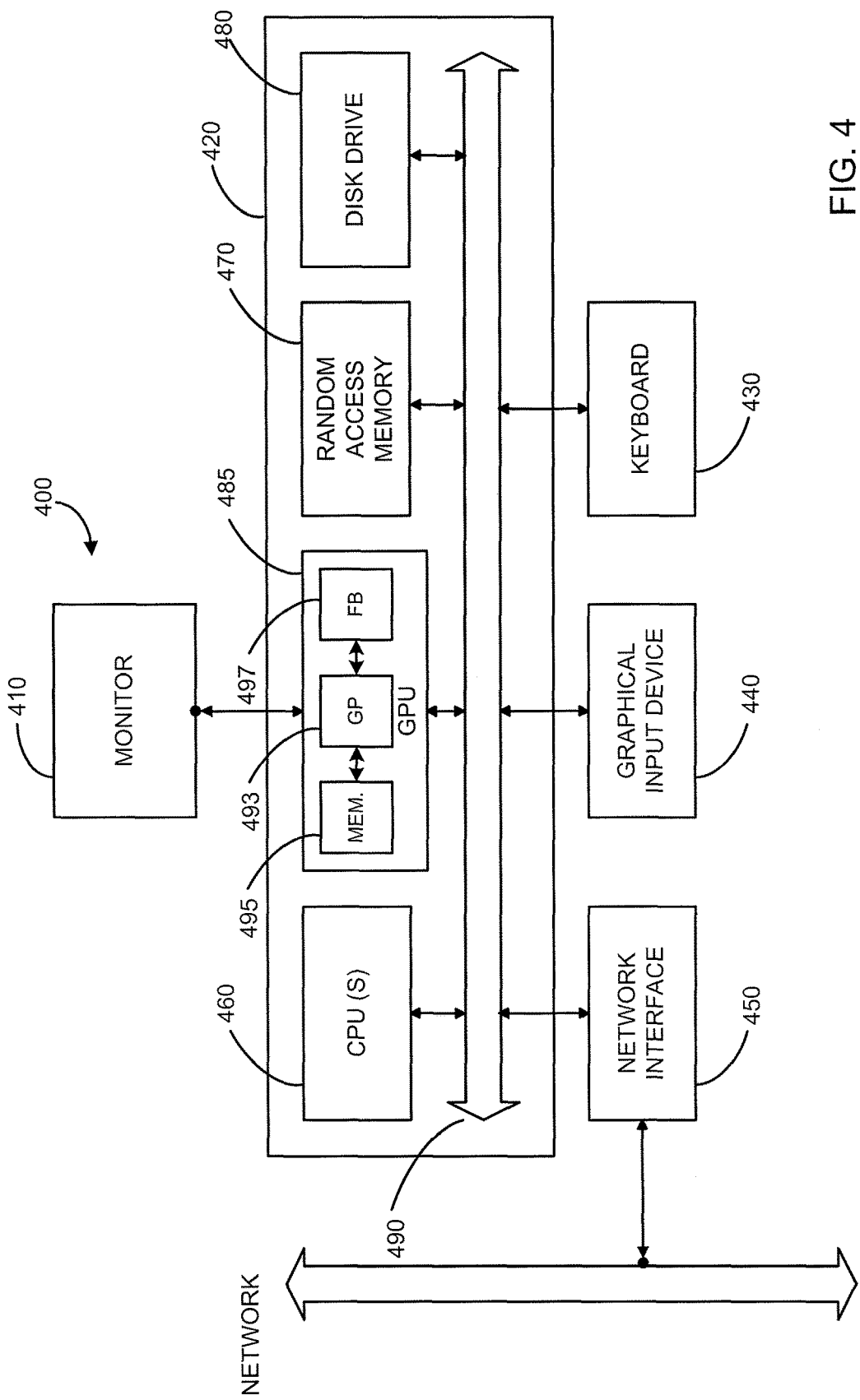
FIG. 4 is a block diagram of a computer system that may be used to practice various embodiments.

FIG. 4 is a block diagram of a computer system that may be used to practice various embodiments. FIG. 4 is merely illustrative of an embodiment and does not limit the scope of the invention as recited in the claims. One of ordinary skill in the art would recognize other variations, modifications, and alternatives.

In one embodiment, computer system 400 typically includes a monitor 410, computer 420, a keyboard 430, a user input device 440, computer interfaces 450, and the like.

In various embodiments, user input device 440 is typically embodied as a computer mouse, a trackball, a track pad, a joystick, wireless remote, drawing tablet, voice command system, eye tracking system, and the like. User input device 440 typically allows a user to select objects, icons, text and the like that appear on the monitor 410 via a command such as a click of a button or the like.

Embodiments of computer interfaces 450 typically include an Ethernet card, a modem (telephone, satellite, cable, ISDN), (asynchronous) digital subscriber line (DSL) unit, FireWire interface, USB interface, and the like. For example, computer interfaces 450 may be coupled to a computer network, to a FireWire bus, or the like. In other embodiments, computer interfaces 450 may be physically integrated on the motherboard of computer 420, and may be a software program, such as soft DSL, or the like.

In various embodiments, computer 420 typically includes familiar computer components such as a processor 460, and memory storage devices, such as a random access memory (RAM) 470, disk drives 480, a GPU 485, and system bus 490 interconnecting the above components. In some embodiments, computer 420 includes one or more Xeon microprocessors from Intel. Further, one embodiment, computer 420 includes a UNIX-based operating system.

RAM 470 and disk drive 480 are examples of tangible media configured to store data such as image files, models including geometrical descriptions of objects, ordered geometric descriptions of objects, procedural descriptions of models, scene descriptor files, shader code, a rendering engine, embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In various embodiments, computer system 400 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 485 may be any conventional graphics processing unit that may be user programmable. Such GPUs are available from NVIDIA, ATI, and other vendors. In this example, GPU 485 includes a graphics processor 493, a number of memories and/or registers 495, and a number of frame buffers 497.

FIG. 4 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

In certain embodiments, the various processing steps are implemented in one of a web browser application, and e-reader application, a document editing application (e.g., MS WORD) or a photo editing application.

The present invention can be implemented in the form of control logic in software or hardware or a combination of both. The control logic may be stored in an information storage medium as a plurality of instructions adapted to direct an information-processing device to perform a set of steps disclosed in embodiments of the present invention. Based on the disclosure and teachings provided herein, a person of ordinary skill in the art will appreciate other ways and/or methods to implement the present invention.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer implemented method of providing a visual guide on a user interface, comprising:
    receiving content to display to a user, the content including a plurality of content items;
    displaying the plurality of content items on a display;
    after displaying the plurality of content items, receiving a content request for a subset of the plurality of the content items;
    after receiving the content request, scoring the plurality of the content items based on the content request;
    determining a first subset of the plurality of the content items based on the score of the content items in the first subset being less than a first threshold; and
    visually deemphasizing the content items in the first subset relative to a base display level without fully removing the first subset of the plurality of the content items or any other content item of the plurality of the content items from the display, wherein the content request is generated based on information in a user profile.

2. The method of claim 1, further comprising:
    receiving context identifiers associated with the content, wherein the context identifiers are associated with contextual meanings of the content, and wherein the content request is associated with one or more context identifiers.

3. The method of claim 2, wherein receiving the content request includes receiving a user selection of one or more context identifiers.

4. The method of claim 3, further comprising:
    displaying the context identifiers as links on the display, wherein the user selection of the one or more context identifiers is received via one or more of the links.

5. The method of claim 1, wherein the plurality of content items includes a plurality of documents.

6. The method of claim 1, wherein visually de-emphasizing includes modifying one or more characteristics of the subset of content items on the display.

7. The method of claim 6, wherein scoring includes determining three or more levels of relevance for the subset of content items, and wherein the visually de-emphasizing includes modifying the one or more characteristics differently for each level of relevance.

8. The method of claim 6, wherein the one or more characteristics include one or more of a color, opacity, contrast, saturation or focus of the subset of content items on the display.

9. The method of claim 1, wherein the content request is generated in response to a user action.

10. The method of claim 1, wherein the display includes one of a monitor display screen, an e-reader display screen, an iPad display, and iPod display, and iPhone display, a cell phone display.

11. The method of claim 1, wherein the method is implemented in one of a web browser application, an e-reader application, a document editing application, or a photo editing application.

12. The method of claim 1, wherein the content items are selected from a group consisting of documents, articles, paragraphs of text, or pictures.

13. The method of claim 1, wherein, after receiving the content request, a display of a second subset of the plurality of content items does not change.

14. The method of claim 1, wherein the first subset of content items are determined based on the score of the first subset of content items being less than a first threshold score, but being greater than a second threshold score.

15. The method of claim 14, further comprising:
    determining a second subset of content items from the plurality of the content items based on the score of the content items in the second subset being less than the second threshold; and
    visually deemphasizing the second subset of content items relative to a base display level without fully removing the second subset of content items from the display; and wherein the deemphasized displaying of the first subset of content items are visually different from the deemphasized displaying of the second subset of content items.

16. A non-transitory computer readable medium that stores code, which when executed by a processor, causes the processor to:
    receive content to display to a user, the content including a plurality of content items;
    display the plurality of content items on a display;
    after displaying the plurality of content items, receive a content request for a subset of the plurality of content items;
    after receiving the content request, score at least the plurality of the content items displayed on the display based on the content request;
    determine a first subset of the plurality of the content items from based on the score of the content items in the first subset being less than a first threshold; and
    visually deemphasize the content items in the first subset relative to a base display level without fully removing the first subset of the plurality of the content items or any other content items in the plurality of the content items from the display, wherein the content request is generated based on information in a user profile.

17. The computer readable medium of claim 16, wherein the code to score includes code to determine three or more levels of relevance for the subset of content items and wherein the code to visually de-emphasize includes code to modify one or more characteristics of the subset of content items on the display differently for each level of relevance.

18. The computer readable medium of claim 17, wherein the one or more characteristics include one or more of a color, opacity, contrast, saturation or focus of the subset of content items on the display.

19. A computer system, comprising:
a display device; and
a processor, coupled with the display device, wherein the processor is configured to:
receive content to display to a user, the content including a plurality of content items;
display the plurality of content items on a display;
after displaying the plurality of content items, receive a content request for a subset of the plurality of the content items;
after receiving the content request, score the plurality of the content items;
determining a first subset of the plurality of the content items based on the score of the content items in the first subset being less than a first threshold; and
visually deemphasizing the first subset of content items relative to a base display level without fully removing the first subset of the plurality of the content items or any other content items in the plurality of the content items from the display, wherein the content request is generated based on information in a user profile.

20. The system of claim 19, wherein the display device includes one of a monitor display screen, an e-reader display screen, an iPad display, and iPod display, and iPhone display, a cell phone display.

21. The system of claim 19, further comprising a user interface device, and wherein the content request is generated in response to a user action using the user interface device.

* * * * *